US008128148B2

United States Patent
Kober et al.

(10) Patent No.: US 8,128,148 B2
(45) Date of Patent: Mar. 6, 2012

(54) VEHICLE WITH AN INSTRUMENT PANEL WHICH IS DESIGNED FOR A SIDE IMPACT

(75) Inventors: Steve Kober, Treuen (DE); Marco Braun, Lug (DE); Christo Gavrilov, München (DE)

(73) Assignee: Faurecia Innenraum Systeme GmbH, Hagenbach (DE)

( * ) Notice: Subject to any disclaimer, the term of this patent is extended or adjusted under 35 U.S.C. 154(b) by 12 days.

(21) Appl. No.: 12/376,851

(22) PCT Filed: Aug. 23, 2007

(86) PCT No.: PCT/EP2007/007574
§ 371 (c)(1),
(2), (4) Date: Feb. 17, 2011

(87) PCT Pub. No.: WO2008/022810
PCT Pub. Date: Feb. 28, 2008

(65) Prior Publication Data
US 2011/0187147 A1    Aug. 4, 2011

(30) Foreign Application Priority Data

Aug. 23, 2006  (DE) .......................... 10 2006 040 032

(51) Int. Cl.
*B60K 37/00*    (2006.01)
(52) U.S. Cl. ................. 296/70; 296/193.02; 296/187.12
(58) Field of Classification Search .................... 296/70, 296/187.12, 193.02, 146.6
See application file for complete search history.

(56) References Cited

U.S. PATENT DOCUMENTS 5,387,023 A * 2/1995 Deneau ........................... 296/72
6,644,690 B2 * 11/2003 Brownlee et al. ............. 280/779

FOREIGN PATENT DOCUMENTS

| DE | 100 21 140 | 10/2001 |
| DE | 10 2004 059215 | 6/2006 |
| FR | 2 669 885 | 6/1992 |

\* cited by examiner

*Primary Examiner* — Joseph Pape
(74) *Attorney, Agent, or Firm* — Fay Kaplun & Marcin, LLP

(57) ABSTRACT

A vehicle contains a vehicle body with two A pillars and two B pillars which bound a vehicle interior, and an instrument panel which is arranged in the interior between the A pillars. The instrument panel has an instrument panel reinforcement. The instrument panel reinforcement has at least one first section and/or one second section, and the first and/or second section extends/extend in each case transversely with respect to the longitudinal direction of the vehicle at least over part of the instrument panel, beginning in each case on the outside of the instrument panel, in order to stiffen the instrument panel against a high force acting on the outsides of the instrument panel, for example against a force which is produced by a side impact. The contour of the instrument panel, including the instrument panel reinforcement, lies at least partially at a height between the A pillars and the B pillars at least in the region of the respective outside of the instrument panel. The instrument panel reinforcement is arranged in that region of the contour of the instrument panel which projects the furthest into the vehicle interior from the direction of the B pillars.

12 Claims, 2 Drawing Sheets

(Figur 1)
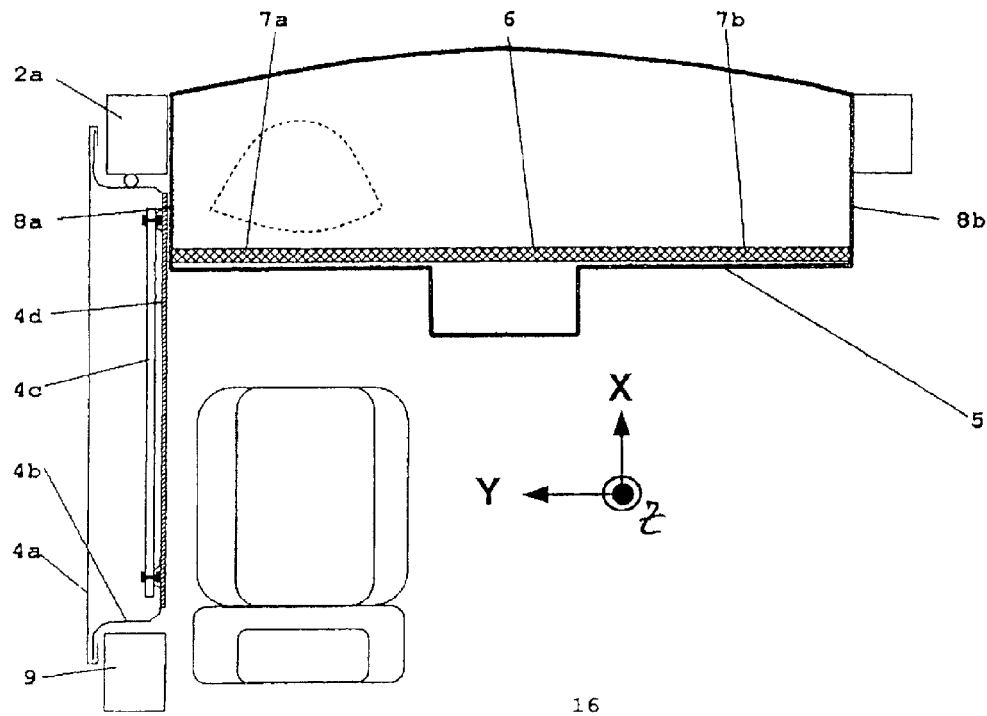
(Figur 2)
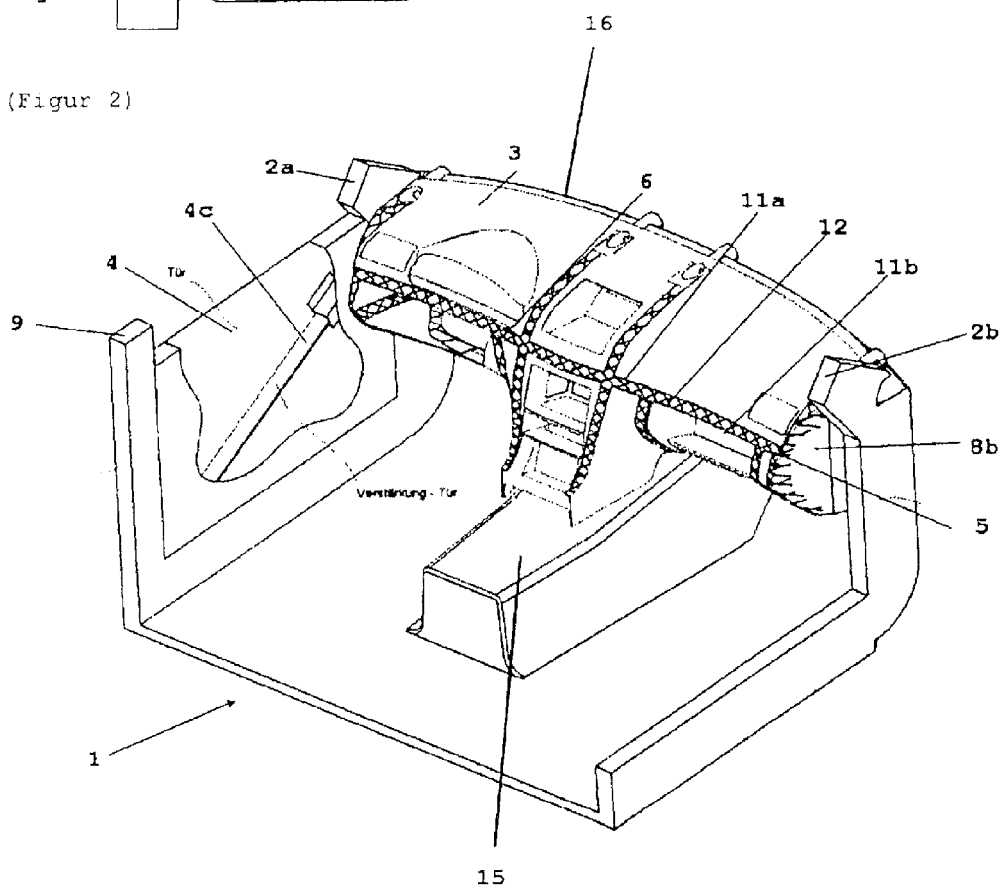

Fig. 3 (PRIOR ART)
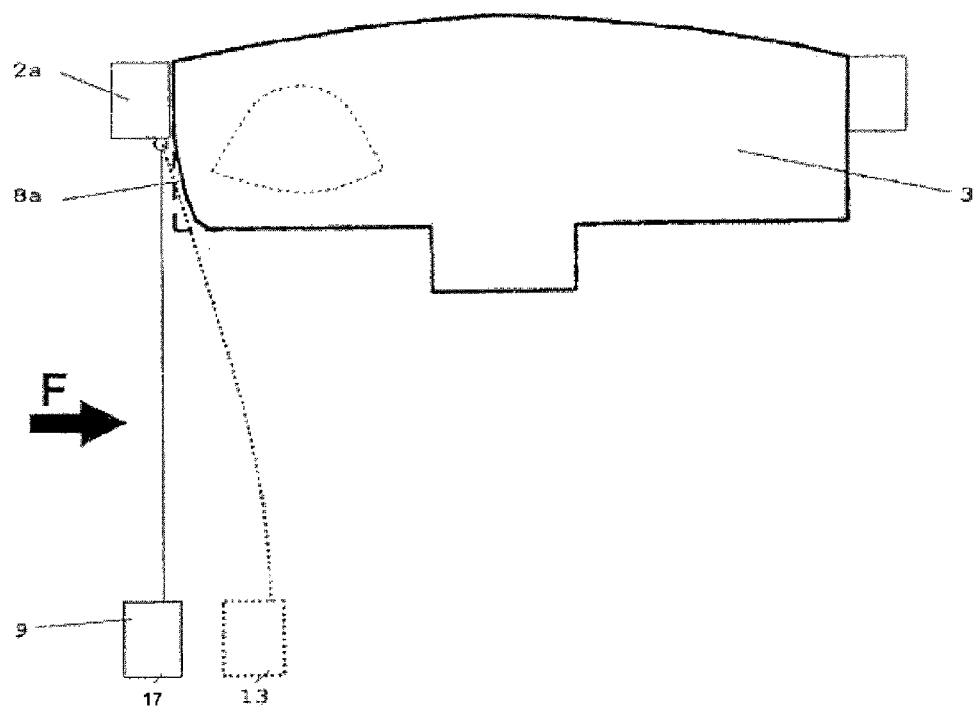
(Figur 4)
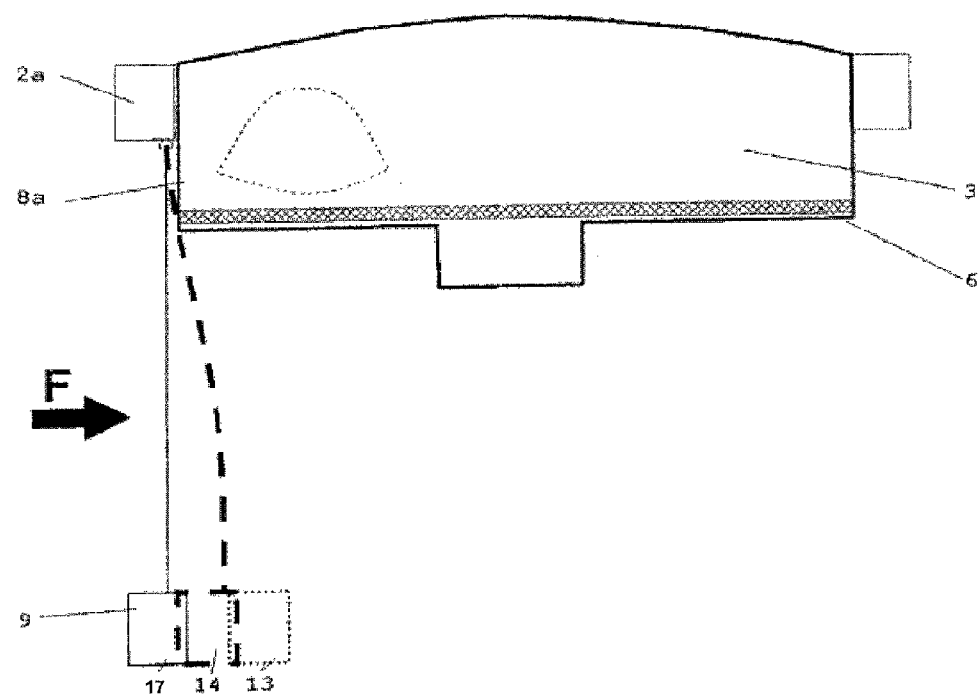

VEHICLE WITH AN INSTRUMENT PANEL WHICH IS DESIGNED FOR A SIDE IMPACT

FIELD OF INVENTION

The present invention relates to an instrument panel of a vehicle.

BACKGROUND INFORMATION

Usually vehicles, in particular automobiles, comprise a vehicle autobody with an A-pillar and B-pillar, which protect the passenger cell from too great a deformation in the case of a side impact.

The region between the A-pillars and B-pillars is however designed relatively weakly in many vehicles. It is particularly in this region that the danger exists of a large deformation and thus a danger to vehicle occupants.

It is known from the document DE 196 33 162, to provide an instrument panel located between the A-pillars, with a reinforcement for the additional strengthening of the passenger cell. In this case, the reinforcement is a rib-structure or wave-structure which forms a support part of the instrument panel, said structure being arranged extending between the A-pillars transversely to the vehicle longitudinal direction. The region between the A-pillars is reinforced with regard to side impact due to the course of the rib structure.

The disadvantage of this solution is the fact that the vehicle autobody, although being stiffened with respect to a side impact, this stiffening however only reaches up to the region of the A-pillars (proceeding from the vehicle front side). The region of the passenger cell which lies in front of the A-pillars, in particular the region between the A-pillars and B-pillars, is stiffened only in an indirect manner by way of the reinforcement, which is why large deformations of the passenger cell are still possible in this region.

DE 10 2004 059 215 A1 discloses a front vehicle door, which is to contribute to an improved passenger protection, in particular with regard to a side impact, wherein a first force transmission element is arranged in a fixed inner in the region and at the height of an instrument panel extending in the vehicle direction, for forming a further force path from the vehicle door into the vehicle autobody, between the door inner sheet metal and the door inner trim, to which first force transmission element an adjacent second force transmission element is assigned, which is arranged within the instrument panel as well as supported on the same and/or load-supporting component of the vehicle autobody.

In the teaching disclosed in this document, one assumes a transverse beam fastened between two A-pillars. The force transmission element is supported on this transverse beam and is thus located further behind the surface of the instrument panel. This arrangement requires a very solid fastening of the element, since the force path is not straight, and the danger exists that the element buckles without transmitting the forces further to the transverse beam, in the case of a side impact.

SUMMARY OF INVENTION

The present invention relates to a vehicle with which an associated passenger cell, in particular in the region between A-pillars and B-pillars, is additionally stabilized in an as effective as possible manner, in particular with regard to deformations caused by a side impact.

The invention creates a vehicle containing a vehicle autobody with two A-pillars and two B-pillars, which delimit a vehicle interior, and an instrument panel arranged between the A-pillars in the interior, wherein the instrument panel comprises an instrument panel reinforcement, wherein the instrument panel reinforcement has at least one first and/or second section, and the first and/or second section in each case beginning at the outer side of the instrument panel, extends at least over a part of the instrument panel transversely to the vehicle longitudinal direction, for stiffening the instrument panel with respect to a high force engaging at the outer sides of the instrument panel, for example a force which is produced by a side impact, wherein the contour of the instrument panel including the instrument panel reinforcement, at least in the region of the respective outer side of the instrument panel, lies at least partly at a height between the A-pillars and the B-pillars, wherein the instrument panel reinforcement is arranged in the region of the contour of the instrument panel, which projects the furthest in the direction of the B-pillars into the vehicle interior.

The device according to the invention or the instrument panel reinforced according to the invention, has the great advantage that this in its load-bearing parts may also be realised as an "integral" concept. This means that reinforcements of ribbed or unribbed plastic may be manufactured, wherein the instrument panel beam structure is formed for these reinforcements as well as for regions of the same plastic lying therebetween, which means it may also be manufactured together in a single step. Advantages with regard to the stability, as well as with regard to costs and weight result by way of this, when compared to hybrid structures, which for example require a carrier skin with a plastic carrier structure or metal carrier structure located thereunder.

This integral concept is also distinguished by the fact that one does not require a conventional transverse beam ("cross car beam") which usually runs between the A-pillars of a motor vehicle. This classic "cross car beam" has disadvantages with regard to the weight as well as to the installation space, so that the absence of this "cross car beam" creates additional construction space.

Compared to the previous state of the art, it is indeed unusual to provide a very strong instrument panel reinforcement (and one which furthermore is possibly integral) at the border of the instrument panel to the interior. This runs somewhat against the trend of normal developments, since other concepts usually design the region directly towards the interior in a very soft manner (motivated somewhat by the "head impact test").

In contrast, the present invention places emphasis on a reinforcement close to the vehicle interior, wherein this reinforcement is primarily to run in the Y-direction (see also FIG. 1 of the subsequent figure description). This does not necessarily entail a corresponding stiffening also in the X-direction, and inasmuch as this is concerned, the instrument panel reinforcement according to the invention here may display a mechanical anisotropy. Even if this anisotropy were not to be given, one could indeed imagine a correspondingly stiff structure, since the stiffening structure is preferably effected at middle height, which means above the knee of vehicle occupant, but below the upper region of an instrument panel.

The anisotropy of the instrument panel reinforcement may here be reinforced once again by way of predetermined break points, roughly in the frontal region in front of the seats of the vehicle occupants.

The instrument panel reinforcement according to the invention may accommodate relatively high forces.

It is thus indeed possible for forces of 5 kilonewtons, preferably 10 kilonewtons, particularly preferably 50 kilonewtons, to be applied in the Y-direction onto the instrument panel reinforcement (for example onto the first section 7a or the second section 7b in FIG. 1 of the following figure description), without breaking or buckling this. The application of a force up to 5 kilonewtons, preferably up to 10 kilonewtons in the Y-direction (see FIG. 1 of the following figure description) preferably only leads to a maximal displacement of the respective section 7a or 7b (see subsequent figure description) of maximal 15 cm, preferably less than 10 cm and particularly preferably less than 5 cm in the X-Z plane.

Thus with the instrument panel reinforcement according to the invention, preferably in an "integral instrument panel concept", one may achieve a stiffening of the instrument panel, and thus a deformation in the Y-direction in the door region may be noticeably reduced. Hereby, it is particularly advantageous that this reinforcement may also be effected in the region between the A-pillar and B-pillar, preferably very greatly orientated towards the B-pillar, so that the lever ratios counteract a large door deformation and thus a total stiffening of the vehicle cell with a conceivably lower total weight is rendered possible.

The instrument panel reinforcement which reinforces the interior of the vehicle additionally with regard to deformation on account of lateral force effects onto the vehicle, according to the invention, lies at a height between A-pillars and B-pillars. The region between the A-pillars and B-pillars which is sensitive to deformation, is additionally reinforced by way of this.

By way of the fact that the instrument panel reinforcement is arranged in the region of the contour of the instrument panel which lies closest the B-pillars, thus projects most deeply into the interior of the motor vehicle, this region may be optimally supported between the pillars (i.e. the stretch between the pillars which is not supported, is shortened), without the instrument panel itself having to be relocated too deeply into the interior.

Of course, it is basically also possible to provide the reinforcement according to the invention on only one side, i.e. for example only on the driver side or only on the front passenger side.

One advantageous formation envisages the vehicle containing a front door arranged between an A-pillar and a B-pillar, wherein the front door comprises a door reinforcement stiffening the front door, and the position of the door reinforcement and the instrument panel reinforcement are matched to one another in such a manner that the force is led from the door reinforcement onto the instrument panel reinforcement in the case of a lateral high force effect onto the front door.

According to the invention, the front door and the instrument panel thus form a cooperating system which is designed for side impact. In the case of a side impact, the door reinforcement leads the forces over to the instrument panel reinforcement, which via this may be led further to further structurally strong components, for example the drive shaft hump, oppositely lying A-pillars or cowl, for the purpose of compensating the forces.

Hollow tubes or struts with a T-shaped or U-shaped profile are suitable as door reinforcements. Advantageously, such a door reinforcement extends over the whole width of the door.

Advantageously, the instrument panel reinforcement is located at a depth of at least 60 mm between the two ends of the door reinforcement, in order to achieve a noticeable improvement of the deformation behaviour.

One further advantageous formation of the invention envisages at least one part region of the door reinforcement and the instrument panel reinforcement overlapping transversely to the vehicle longitudinal direction.

In this case, given a side impact, due to the overlapping with the instrument panel reinforcement in the transverse direction, the door reinforcement is pressed directly onto the instrument panel reinforcement, despite a possible distance between the door reinforcement and the instrument panel reinforcement, which may not usually be avoided (for example by way of a door trim or by way of a foam layer and decor layer of the instrument panel).

According to a further advantageous formation, the distance between the door reinforcement and the instrument panel reinforcement is to be designed as small as possible. Advantageously, here a maximal distance of 80 mm, preferably at the most 60 mm is advantageous.

By way of the minimisation of the distance between the door reinforcement and the instrument panel reinforcement, which must firstly be bridged so that the door reinforcement is additionally supported by the instrument panel reinforcement, one prevents the front door from being greatly deformed before the reinforcement effect of the instrument panel reinforcement is utilised.

One further advantageous further formation of the invention envisages the instrument panel reinforcement having a rib structure.

A rib structure permits the further leading of the occurring forces directly to parts of the vehicle autobody, for example to the cowl, the drive shaft hump or oppositely lying A-pillars, by way of adapting the course of the ribs to the loads, which in particular act on the instrument panel in the case of a side impact. By way of the fact that a rib structure, with regard to its course and its wall thickness, may be designed in quite a targeted manner, the spatial requirement and the weight of such reinforcement may be reduced to a minimum.

Advantageously, the rib structure is designed on the rear side of a rigid flat instrument panel beam which belongs to the instrument panel and which provides shape and mechanical stability, and is preferably designed as one piece with the instrument panel carrier.

An arrangement of the rib structure directly on the rear side of the instrument panel carrier permits the arrangement of the rib structure projecting as deeply as possible into the interior, without compromising the viewed surface of the instrument panel.

Advantageously, the rib structure comprises at least one, preferably at least two flat support walls running essentially in the vehicle transverse direction.

The support walls accommodate the main part of the forces engaging on the outer sides of the instrument panel.

These forces are accommodated by these ribbings and are led directly to parts of the vehicle autobody, for example to the cowl, drive shaft hump or oppositely lying A-pillars, through straight-line force paths.

Advantageously, at least one support wall, preferably both support walls, extend over the whole width of the instrument panel. In this manner, the force may for example be led up to oppositely lying A-pillars.

Advantageously, the rib structure comprises transverse ribs which are arranged at least between the support walls.

The transverse ribs serve mainly for stabilising the support walls, and in particular prevent these from buckling away under pressure.

In particular, in the case of at least two support walls lying opposite one another, adjacent support walls are directly connected to one another by way of transverse ribs.

One advantageous further formation envisages the transfer ribs being designed in the form of cross ribbings or zigzag ribbings or in the form of a honeycomb structure.

With this, the support walls are adequately stabilised in the case of side impact.

The ribbing is preferably dimensioned in a manner such that unallowably high acceleration values do not occur in the case of a frontal collision given head contact or knee contact. This may be effected by way of a bending stiffness adapted to the height of the ribbing, by way of suitable predetermined breaking locations within the ribbing, or by way of a positioning of the ribbing obliquely to the instrument panel surface, by which means a buckling out of the reinforcement structure occurs in the later case.

Advantageously, the instrument panel carrier, support walls and transverse ribs are mainly or completely manufactured of the same material, preferably of a polymer, preferably a fibre-reinforced polymer, for example fibre-reinforced polypropylene.

The instrument panel carrier, support walls and transverse ribs may in particular be manufactured together via a preferably single injection moulding process or by way of a pressing process. Thereby, it is basically possible during the manufacturing process to incorporate strengthening inlays such as endless fibres or mats, into the tool.

Advantageously, the rib structure at least partly, preferably completely, is positioned directly on the instrument panel in the mould removal direction of the instrument panel or of the instrument panel carrier, i.e. the support walls and transverse ribs have a common alignment.

One may make do without a slide by way of the fact that the rib structure is positioned in the mould removal direction, and the manufacturing process is particularly inexpensive on account of this.

A further advantageous further formation of the invention envisages the instrument panel being a self-supporting instrument panel.

Such an instrument panel requires nothing other than a carrier of the instrument panel (and further components provided in this region, for example the glove box etc.), the usual transverse beam (as a rule a metal tube which is fastened between the A-pillars). A self-supporting instrument panel achieves an adequate stiffness and stability by way of suitable structuring or reinforcements, in particular by way of rib designs. Despite this, one may of course also provide a common transverse beam.

BRIEF DESCRIPTION OF DRAWINGS

The invention is now explained in more detail by way of an embodiment example which is represented by several figures.

FIG. 1 shows a vehicle cut-out in a plan view, according to one embodiment according to the invention, FIG. 2 shows an oblique view of the complete front region of the vehicle interior, and FIG. 3 shows a vehicle cut-out in a plan view without a horizontal reinforcement and FIG. 4 shows a vehicle cut-out in a plan view with a horizontal reinforcement of the instrument panel according to the invention.

DETAILED DESCRIPTION

FIG. 1 schematically shows a plan view of a cut-out of a vehicle according to one embodiment according to the invention.

The vehicle comprises a vehicle autobody 1 with two A-pillars 2a, 2b and two B-pillars 9 (for this see already FIG. 2) which delimit the vehicle interior. Moreover, the vehicle contains an instrument panel 3 arranged between the A-pillars 2a, 2b in the interior. An instrument panel reinforcement 6 is arranged in the region 5 of the contour of the instrument panel 3, which is furthest to the interior, thus in the region 5 of the contour of the instrument panel which lies closes to the B-pillars 9. The instrument panel reinforcement 6 is represented by a cross hatching in FIG. 1 and FIG. 4, and in FIG. 2 is represented with details.

The instrument panel reinforcement 6 extends transversely over the whole width of the instrument panel 3. In particular, the instrument panel reinforcement 6 comprises a first section 7a and a second section 7b, wherein the first and the second section 7a, 7b, in each case at the outer side 8a, 8b of the instrument panel 3 beginning at least over a part of the instrument panel 3, extends transversely to the vehicle longitudinal direction, by which means the instrument panel 3 is reinforced with regard to a high force engaging in particular at the outer sides 8a, 8b of the instrument panel 3, for example a force which is produced by a side impact.

The door is usually constructed of door outer sheet metal 4a, door inner sheet metal 4b, door reinforcement 4c and door trim 4d. The instrument panel is arranged in the vehicle such that it overlaps to the adjacent door in the regions 8a and 8b, in a manner such that a direct flow of force between the door outer sheet metal 4a via door reinforcement 4c, door inner sheet metal 4b and door trim 4d, to the instrument panel reinforcement 6 occurs in the case of a lateral collision.

FIG. 2 shows details of the embodiment according to the invention.

The door reinforcement 4c is usually designed as a press mould part (e.g. as a cap profile) or, as also here, as a hollow profile (e.g. tube profile) and in the shown case extends diagonally over the whole width of the front door beginning from the bottom left on the B-pillar to the top right on the A-pillar.

The instrument panel reinforcement 6, here formed by a rib construction, is arranged essentially in the region of the apex point 5 of the instrument panel, thus the region which lies closest to the B-pillars. Further rib structures are provided, in order on the one hand to reinforce the instrument panel, and on the other hand to lead the forces which act on the rib structure 6, effectively onto other vehicle components, in particular onto oppositely lying A-pillars 2b, transmission bulge 15 and cowl 16.

The positions of the door reinforcement 4c and the instrument panel reinforcement 6 are matched to one another in a manner such that in the case of a laterally high force effect on the front door 4, the force is led from the door reinforcement 4c onto the instrument panel reinforcement 6.

In order to achieve this, the upper section of the door reinforcement 4c and the instrument panel reinforcement 6 located in the contour of the instrument panel 3, extend transversely to the vehicle longitudinal direction. The distance between the door reinforcement 4c and the instrument panel reinforcement 6 is preferably advantageously maximally 80 mm, but preferably less than 60 mm.

The instrument panel in this embodiment example comprises a three-layered construction with a carrier providing the mechanical stability and setting the shape, with a foam layer and a decor layer forming the viewed side of the instrument panel. It would alternatively be likewise possible to make do without the foam layer or even the decor layer.

The rib structure 6 comprises two flat support walls 11a, 11b which run essentially in the vehicle transverse direction and which are orientated essentially orthogonally to the instrument panel surface and are distanced to one another by way of transverse ribs 12 which are directly connected to these.

The transverse ribs 12, here, as FIG. 2 shows, are designed as cross ribbing. Other ribbings are basically also possible, in particular a zigzag ribbing.

Moreover, the instrument panel carrier, support walls and transverse ribs consist of the same material, here a thermoplastic polymer which is reinforced with glass fibre. The instrument panel carrier, transverse ribs and support walls are moreover connected to one another as one piece. They are manufactured together in a single injection moulding process. The complete rib structure thereby is aligned in the mould removal direction, so that one may make do without slides.

FIG. 3 shows a plan view of a conventional instrument panel 3 without horizontal instrument panel reinforcement 6. The door hereby is represented in a schematic manner wherein FIG. 3 shows the position of the door and B-pillar before the collision 17 and after the collision 13. Thereby, without an instrument panel reinforcement 6, a deformation or destruction of the instrument panel takes place in the region of the overlapping between the door and instrument panel 8a. The door may penetrate between the A-pillar 2 and the B-pillar 9 into the interior in an unhindered manner.

FIG. 4 shows the plan view of an instrument panel with an instrument panel reinforcement 6 according to the invention, wherein here, analogously to FIG. 3, the position of B-pillar and door is shown before the collision 17 and after the collision 14. Thereby, the door between A-pillar 2a and B-pillar 9 is additionally supported by the instrument panel reinforcement, by which means a shortening of the lever arm results given a force engaging orthogonally to the vehicle longitudinal direction. The penetration of the door and B-pillar is reduced on account of this (with regard to this, see the position of the B-pillar after collision without instrument panel reinforcement 13).

A further support point is created between the A-pillar 2a and the B-pillar 9 with the instrument panel according to the invention, and this support point shortens the region between the A-pillar 2a and B-pillar 9 which is prone to deformation, and may accommodate a part of the forces F, so that the deformation between the A-pillars and B-pillars into the vehicle interior may be significantly reduced.

The invention claimed is:

1. An instrument panel of a vehicle, the vehicle including a vehicle autobody which has two A-pillars and two B-pillars which delimit a vehicle interior, comprising:
    an instrument panel reinforcement which is part of the instrument panel and includes at least one of (a) a first section and (b) a second section, at least one of the sections beginning at an outer side of the instrument panel and extending at least over a part of the instrument panel transversely to a vehicle longitudinal direction, for stiffening the instrument panel with respect to a high force which engages on the outer side of the instrument panel,
    wherein the instrument panel reinforcement extends continuously over an entire width of the instrument panel,
    wherein the instrument panel is arranged between the A-pillars in the interior,
    wherein a contour of the instrument panel including the instrument panel reinforcement, at least in the region of the outer side of the instrument panel, lies at least partly at a position in the vehicle longitudinal direction between the A-pillars and the B-pillars, and
    wherein the instrument panel reinforcement is arranged in a region of the contour of the instrument panel which, in the vehicle longitudinal direction, projects furthest into the vehicle interior so that the region is closest to the B-pillars.

2. The panel of claim 1, wherein the vehicle includes a front door arranged between an A-pillar and a B-pillar, wherein the front door includes a door reinforcement stiffening the front door and a position of the door reinforcement and a position of the instrument panel reinforcement are matched to one another in a manner such that in the case of the high force effect onto the front door, the force is led from the door reinforcement onto the instrument panel reinforcement.

3. The panel of claim 2, wherein the door reinforcement and the instrument panel reinforcement, overlap transversely to the vehicle longitudinal direction.

4. The panel of claim 2, wherein the door reinforcement and the instrument panel reinforcement have a maximal distance relative to each other of at the most 80 mm.

5. The panel of claim 2, wherein the door reinforcement and the instrument panel reinforcement have a maximal distance relative to each other of at the most 60 mm.

6. The panel of claim 1, wherein the instrument panel reinforcement has a rib structure.

7. The panel of claim 6, wherein the rib structure extends continuously over a whole width of the instrument panel.

8. The panel of claim 6, wherein the rib structure includes at least one flat support wall which runs essentially in a vehicle transverse direction.

9. The panel of claim 6, wherein the rib structure includes at least two flat support walls which run essentially in a vehicle transverse direction.

10. The panel of claim 9, wherein the rib structure includes transverse ribs which are arranged at least between the support walls for a mechanical stabilization of the support walls.

11. The panel of claim 10, wherein the transverse ribs have a shape of one of cross ribbings and zigzag ribbings.

12. The panel of claim 1, wherein the instrument panel is a self-supporting instrument panel.

* * * * *